US010265932B2

(12) United States Patent
McGuire, Jr.

(10) Patent No.: US 10,265,932 B2
(45) Date of Patent: Apr. 23, 2019

(54) PROTECTIVE SHEETS, ARTICLES, AND METHODS

(75) Inventor: James E. McGuire, Jr., Columbus, OH (US)

(73) Assignee: entrotech, inc., Columbus, OH (US)

( * ) Notice: Subject to any disclaimer, the term of this patent is extended or adjusted under 35 U.S.C. 154(b) by 447 days.

(21) Appl. No.: 12/090,574

(22) PCT Filed: Oct. 23, 2006

(86) PCT No.: PCT/US2006/060171
§ 371 (c)(1),
(2), (4) Date: Apr. 17, 2008

(87) PCT Pub. No.: WO2007/048145
PCT Pub. Date: Apr. 26, 2007

(65) Prior Publication Data
US 2008/0286576 A1 Nov. 20, 2008

(51) Int. Cl.
*B32B 27/40* (2006.01)
*B32B 37/00* (2006.01)
*B32B 27/08* (2006.01)
*B29C 37/00* (2006.01)
*B29C 43/12* (2006.01)
*B29C 51/28* (2006.01)
*B29C 70/08* (2006.01)
*B29C 70/44* (2006.01)
*B32B 27/18* (2006.01)
*B32B 27/30* (2006.01)
*B32B 27/32* (2006.01)
*B32B 27/38* (2006.01)
*B29C 43/36* (2006.01)
*B29K 105/08* (2006.01)
*B29K 105/24* (2006.01)
*B29L 9/00* (2006.01)
*B29L 31/52* (2006.01)

(52) U.S. Cl.
CPC .......... *B32B 27/08* (2013.01); *B29C 37/0025* (2013.01); *B29C 43/12* (2013.01); *B29C 51/28* (2013.01); *B29C 70/086* (2013.01); *B29C 70/44* (2013.01); *B32B 27/18* (2013.01); *B32B 27/304* (2013.01); *B32B 27/322* (2013.01); *B32B 27/38* (2013.01); *B32B 27/40* (2013.01); *B29C 2043/3644* (2013.01); *B29C 2791/006* (2013.01); *B29K 2105/0854* (2013.01); *B29K 2105/243* (2013.01); *B29L 2009/001* (2013.01); *B29L 2031/52* (2013.01); *B32B 2307/4023* (2013.01); *B32B 2307/714* (2013.01); *B32B 2307/752* (2013.01); *B32B 2509/00* (2013.01); *B32B 2603/00* (2013.01); *B32B 2605/18* (2013.01); *Y10T 156/10* (2015.01); *Y10T 428/239* (2015.01); *Y10T 428/24364* (2015.01); *Y10T 428/249939* (2015.04); *Y10T 428/26* (2015.01); *Y10T 428/31507* (2015.04); *Y10T 428/31551* (2015.04)

(58) Field of Classification Search
None
See application file for complete search history.

(56) References Cited

U.S. PATENT DOCUMENTS

| | | | |
|---|---|---|---|
| 2,914,556 A | 11/1958 | Hostettler et al. | |
| 2,871,218 A * | 1/1959 | Schollenberger | C08G 18/664 156/331.7 |
| 3,294,724 A * | 12/1966 | Axelrood | C08G 18/10 524/839 |
| 3,296,196 A | 1/1967 | Lamoreaux | |
| 3,463,662 A | 8/1969 | Hodes et al. | |
| 3,509,015 A | 4/1970 | Wismer et al. | |
| 3,523,100 A | 8/1970 | Stein et al. | |
| 3,523,101 A | 8/1970 | Reuter | |
| 3,549,583 A | 12/1970 | Nobuyoshi et al. | |
| 3,554,951 A | 1/1971 | Blomeyer et al. | |
| 3,616,198 A | 10/1971 | Kenji | |
| 3,661,672 A | 5/1972 | John | |
| 3,867,350 A * | 2/1975 | Pedain | C08G 18/10 528/44 |
| 3,899,467 A | 8/1975 | Bonk et al. | |
| 3,899,621 A | 8/1975 | Willdorf | |
| 4,007,151 A | 2/1977 | Ogawa et al. | |
| 4,081,578 A | 3/1978 | Van Essen et al. | |
| 4,092,198 A | 5/1978 | Herbert et al. | |
| 4,092,199 A | 5/1978 | Israel et al. | |
| 4,093,766 A | 6/1978 | Herbert et al. | |
| 4,101,698 A | 7/1978 | Dunning et al. | |
| 4,154,882 A | 5/1979 | Israel et al. | |
| 4,201,799 A | 5/1980 | Stephens | |
| 4,207,356 A | 6/1980 | Waugh | |
| 4,241,140 A | 12/1980 | Ammons | |
| 4,296,156 A | 10/1981 | Lustig et al. | |

(Continued)

FOREIGN PATENT DOCUMENTS

| | | |
|---|---|---|
| AU | 572168 | 5/1988 |
| DE | 2600241 | 7/1977 |

(Continued)

OTHER PUBLICATIONS

"Argotec Fills Industry Need with Thin, Aliphatic-Grade Polyurethane Films," *Argotec Press Release*, www.argotecinc.com (2006).

(Continued)

*Primary Examiner* — Callie E Shosho
*Assistant Examiner* — Patrick N English
(74) *Attorney, Agent, or Firm* — The Griffith Law Firm, A P.C.; Lisa M. Griffith

(57) ABSTRACT

Multi-layer protective sheets of the invention are extensible. They are useful in a range of indoor and outdoor applications in, for example, the transportation, architectural and sporting goods industries. The protective sheets can advantageously be applied to at least a portion of a surface of any article where protection is desired. Methods of the invention include those for forming protective sheets of the invention and applying them to articles.

32 Claims, No Drawings

(56) References Cited

U.S. PATENT DOCUMENTS

| | | | |
|---|---|---|---|
| 4,371,686 A * | 2/1983 | Yamamoto et al. | 528/76 |
| 4,387,129 A * | 6/1983 | Vincent | B32B 27/08 |
| | | | 428/195.1 |
| 4,420,525 A | 12/1983 | David | |
| 4,476,293 A | 10/1984 | Robinson | |
| 4,496,628 A | 1/1985 | Deatcher et al. | |
| 4,501,852 A | 2/1985 | Markusch et al. | |
| 4,530,976 A | 7/1985 | Kordomenos et al. | |
| 4,540,622 A * | 9/1985 | Brunion | B32B 27/08 |
| | | | 428/216 |
| 4,550,052 A | 10/1985 | Malek | |
| 4,578,426 A | 3/1986 | Lenz et al. | |
| 4,611,043 A | 9/1986 | Burson et al. | |
| 4,657,795 A | 4/1987 | Foret | |
| 4,705,721 A | 11/1987 | Frisch et al. | |
| 4,741,961 A | 5/1988 | Frisch et al. | |
| 4,745,152 A | 5/1988 | Fock et al. | |
| 4,748,192 A | 5/1988 | Smith | |
| 4,751,121 A | 6/1988 | Kuhnel et al. | |
| 4,766,038 A | 8/1988 | de Vroom et al. | |
| 4,774,043 A | 9/1988 | Beckmann | |
| 4,810,540 A | 3/1989 | Ellison et al. | |
| 4,900,611 A * | 2/1990 | Carroll, Jr. | 428/216 |
| 4,913,760 A * | 4/1990 | Benson et al. | 156/244.11 |
| 4,917,928 A | 4/1990 | Heinecke | |
| 4,919,994 A | 4/1990 | Joseph | |
| 4,921,776 A | 5/1990 | Taylor | |
| 4,931,324 A | 6/1990 | Ellison et al. | |
| 4,933,237 A * | 6/1990 | Krenceski et al. | 428/423.7 |
| 4,948,654 A | 8/1990 | Brooks et al. | |
| 4,966,527 A | 10/1990 | Merz | |
| 5,034,275 A | 7/1991 | Pearson et al. | |
| 5,055,346 A | 10/1991 | Rohrbacher | |
| 5,070,172 A | 12/1991 | Hirai et al. | |
| 5,077,373 A | 12/1991 | Tsuda et al. | |
| 5,114,514 A | 5/1992 | Landis | |
| 5,114,789 A * | 5/1992 | Reafler | 428/328 |
| 5,123,814 A | 6/1992 | Burdick et al. | |
| 5,141,783 A | 8/1992 | Corsi et al. | |
| 5,203,189 A * | 4/1993 | Lovejoy et al. | 72/53 |
| 5,215,811 A * | 6/1993 | Reafler et al. | 428/212 |
| 5,219,643 A | 6/1993 | Schmidt et al. | |
| 5,232,527 A | 8/1993 | Vernhet et al. | |
| 5,242,744 A * | 9/1993 | Schryer | C08K 3/22 |
| | | | 442/414 |
| 5,242,751 A | 9/1993 | Hartman | |
| 5,268,215 A * | 12/1993 | Krenceski et al. | 428/213 |
| 5,288,356 A * | 2/1994 | Benefiel | 156/196 |
| 5,306,548 A | 4/1994 | Zabrocki et al. | |
| 5,310,080 A | 5/1994 | Figge | |
| 5,334,450 A | 8/1994 | Zabrocki et al. | |
| 5,342,666 A | 8/1994 | Ellison et al. | |
| 5,391,686 A | 2/1995 | Jadhav et al. | |
| 5,403,880 A | 4/1995 | Hegedus et al. | |
| 5,405,675 A * | 4/1995 | Sawka | B29C 59/026 |
| | | | 428/195.1 |
| 5,468,532 A * | 11/1995 | Ho et al. | 428/40.9 |
| 5,478,596 A | 12/1995 | Gurney | |
| 5,486,096 A | 1/1996 | Hertel et al. | |
| 5,518,786 A * | 5/1996 | Johnson et al. | 428/40.6 |
| 5,556,677 A | 9/1996 | Quigley et al. | |
| 5,560,979 A | 10/1996 | Bloom et al. | |
| 5,562,979 A | 10/1996 | Easterlow et al. | |
| 5,563,206 A | 10/1996 | Eicken et al. | |
| 5,567,502 A | 10/1996 | Miyabara et al. | |
| 5,582,887 A | 12/1996 | Etheredge | |
| 5,587,230 A | 12/1996 | Lin et al. | |
| 5,604,006 A | 2/1997 | Ponchaud et al. | |
| 5,614,297 A * | 3/1997 | Velazquez | 428/212 |
| 5,620,819 A | 4/1997 | Conforti et al. | |
| 5,641,374 A | 6/1997 | Peterson et al. | |
| 5,688,571 A | 11/1997 | Quigley et al. | |
| 5,707,941 A | 1/1998 | Haberle | |
| 5,736,204 A | 4/1998 | Suskind | |
| 5,768,285 A | 6/1998 | Griep et al. | |
| 5,770,313 A | 6/1998 | Furumoto et al. | |
| 5,786,285 A | 7/1998 | Walla et al. | |
| 5,820,491 A | 10/1998 | Hatch et al. | |
| 5,848,769 A | 12/1998 | Fronek et al. | |
| 5,849,168 A | 12/1998 | Lutz | |
| 5,858,495 A | 1/1999 | Eikmeier et al. | |
| 5,866,257 A | 2/1999 | Schledjewski et al. | |
| 5,877,254 A | 3/1999 | La Casse et al. | |
| 5,882,775 A | 3/1999 | Matsui et al. | |
| 5,912,081 A | 6/1999 | Negele et al. | |
| 5,912,193 A | 6/1999 | Iwata et al. | |
| 5,912,195 A | 6/1999 | Walla et al. | |
| 5,928,778 A | 7/1999 | Takahashi et al. | |
| 5,939,188 A | 8/1999 | Moncur et al. | |
| 5,945,199 A | 8/1999 | Morin et al. | |
| 5,955,204 A | 9/1999 | Yamamoto et al. | |
| 5,965,256 A | 10/1999 | Barrera | |
| 5,968,444 A | 10/1999 | Yamamoto | |
| 5,985,079 A | 11/1999 | Ellison | |
| 6,001,906 A * | 12/1999 | Golumbic | 524/104 |
| 6,037,054 A | 3/2000 | Shirai et al. | |
| 6,054,208 A | 4/2000 | Rega et al. | |
| 6,071,583 A | 6/2000 | Pomerantz | |
| 6,096,396 A | 8/2000 | Patton et al. | |
| 6,132,864 A | 10/2000 | Kiriazis et al. | |
| 6,153,718 A | 11/2000 | Imashiro et al. | |
| 6,177,189 B1 | 1/2001 | Rawlings et al. | |
| 6,210,295 B1 | 4/2001 | Yoneyama | |
| 6,210,796 B1 | 4/2001 | Lobert et al. | |
| 6,254,712 B1 * | 7/2001 | Enlow et al. | 156/244.11 |
| 6,258,918 B1 | 7/2001 | Ho et al. | |
| 6,319,353 B1 * | 11/2001 | Mussig | 156/334 |
| 6,336,988 B1 | 1/2002 | Enlow et al. | |
| 6,369,186 B1 | 4/2002 | Branlard et al. | |
| 6,383,644 B2 * | 5/2002 | Fuchs | 428/424.8 |
| 6,389,602 B1 | 5/2002 | Alsaffar | |
| 6,399,193 B1 | 6/2002 | Ellison | |
| 6,436,531 B1 | 8/2002 | Kollaja et al. | |
| 6,458,875 B1 | 10/2002 | Sandlin et al. | |
| 6,458,880 B1 | 10/2002 | Onder et al. | |
| 6,475,559 B1 | 11/2002 | Bettinger | |
| 6,475,616 B1 | 11/2002 | Dietz et al. | |
| 6,479,142 B1 | 11/2002 | Condon et al. | |
| 6,485,836 B2 | 11/2002 | Reihs et al. | |
| 6,518,359 B1 | 2/2003 | Clemens et al. | |
| 6,518,389 B1 | 2/2003 | Kaufhold et al. | |
| 6,521,164 B1 | 2/2003 | Plummer et al. | |
| 6,521,337 B2 | 2/2003 | Yanagiuchi | |
| 6,579,601 B2 | 6/2003 | Kollaja et al. | |
| 6,592,173 B2 | 7/2003 | Hardgrive et al. | |
| 6,602,591 B1 | 8/2003 | Smith | |
| 6,607,831 B2 | 8/2003 | Ho et al. | |
| 6,612,944 B1 | 9/2003 | Bureau | |
| 6,624,276 B2 | 9/2003 | Lamers et al. | |
| 6,627,018 B1 | 9/2003 | O'Neill et al. | |
| 6,638,467 B1 | 10/2003 | Yamamoto | |
| 6,642,159 B1 | 11/2003 | Bhatnagar et al. | |
| 6,649,003 B1 | 11/2003 | Spain et al. | |
| 6,649,693 B2 | 11/2003 | Konishi et al. | |
| 6,651,011 B1 | 11/2003 | Bache | |
| 6,659,625 B2 | 12/2003 | Hanasaki | |
| 6,673,428 B1 | 1/2004 | Reafler | |
| 6,677,028 B1 | 1/2004 | Lasch et al. | |
| 6,680,111 B1 | 1/2004 | Leibler et al. | |
| 6,682,679 B1 | 1/2004 | Marentic et al. | |
| 6,709,723 B2 | 3/2004 | Roys et al. | |
| 6,709,748 B1 | 3/2004 | Ho et al. | |
| 6,713,185 B2 | 3/2004 | Carlson et al. | |
| 6,723,427 B1 | 4/2004 | Johnson et al. | |
| 6,723,472 B2 | 4/2004 | Nakanishi et al. | |
| 6,726,971 B1 * | 4/2004 | Wong | 428/40.1 |
| 6,730,388 B2 | 5/2004 | MacQueen et al. | |
| 6,733,870 B2 | 5/2004 | Enlow et al. | |
| 6,734,273 B2 | 5/2004 | Onder | |
| 6,753,056 B1 | 6/2004 | Mizumoto | |
| 6,755,757 B2 | 6/2004 | Sutherland | |
| 6,762,243 B2 | 7/2004 | Stender et al. | |
| 6,770,360 B2 | 8/2004 | Mientus et al. | |
| 6,790,525 B2 | 9/2004 | Takeuchi et al. | |

(56) References Cited

U.S. PATENT DOCUMENTS

| | | | |
|---|---|---|---|
| 6,790,526 B2 | 9/2004 | Vargo et al. |
| 6,797,098 B2 | 9/2004 | Watanabe et al. |
| 6,806,212 B2 | 10/2004 | Fyfe |
| 6,811,628 B1 | 11/2004 | Reid et al. |
| 6,824,818 B2 | 11/2004 | McCoy et al. |
| 6,824,834 B2 | 11/2004 | Schafheutle et al. |
| 6,827,895 B1 | 12/2004 | Yamamoto |
| 6,835,267 B1 | 12/2004 | Spain et al. |
| 6,838,130 B1 | 1/2005 | Spain et al. |
| 6,852,268 B1 | 2/2005 | Valyi et al. |
| 6,852,377 B2 | 2/2005 | Bohm et al. |
| 6,852,418 B1 | 2/2005 | Zurbig et al. |
| 6,866,383 B2 | 3/2005 | Kirit et al. |
| 6,869,496 B1 | 3/2005 | Kollaja et al. |
| 6,881,856 B2 | 4/2005 | Tanaka et al. |
| 6,890,628 B2 | 5/2005 | Kerr |
| 6,893,596 B2 | 5/2005 | Haas et al. |
| 6,894,084 B2 | 5/2005 | Kovar et al. |
| 6,908,401 B2 | 6/2005 | Cheng |
| 6,966,962 B2 | 11/2005 | Spain et al. |
| 6,998,084 B2 | 2/2006 | Horansky |
| 7,005,103 B2 | 2/2006 | Smith et al. |
| 7,005,183 B2 | 2/2006 | Kondo |
| 7,005,794 B2 | 2/2006 | Watanabe et al. |
| 7,011,777 B2 | 3/2006 | Schmidt |
| 7,048,989 B2 | 5/2006 | Watkins et al. |
| 7,141,294 B2 | 11/2006 | Sakurai et al. |
| 7,141,303 B2 | 11/2006 | Clemens et al. |
| 7,160,973 B2 | 1/2007 | Ohrbom et al. |
| 7,166,249 B2 | 1/2007 | Abrams et al. |
| 7,279,057 B2 | 10/2007 | Reid et al. |
| 7,282,533 B2 | 10/2007 | Kreitschmann et al. |
| 7,316,832 B2 | 1/2008 | Steinhardt et al. |
| RE40,723 E | 6/2009 | Matsui et al. |
| 7,854,985 B2 | 12/2010 | Song et al. |
| 7,931,954 B2 | 4/2011 | Kobayashi et al. |
| 8,062,451 B2 | 11/2011 | Mozer et al. |
| 8,071,000 B2 | 12/2011 | Neitzke et al. |
| 8,117,679 B2 | 2/2012 | Pierce |
| 8,501,315 B2 | 8/2013 | Tanaka et al. |
| 8,545,959 B2 | 10/2013 | McGuire et al. |
| 8,545,960 B2 | 10/2013 | McGuire et al. |
| 8,551,279 B2 | 10/2013 | Johnson et al. |
| 8,568,849 B2 | 10/2013 | Shi et al. |
| 9,292,128 B1 | 3/2016 | Huang |
| 2002/0006516 A1* | 1/2002 | Ito et al. ............... 428/424.2 |
| 2002/0015772 A1 | 2/2002 | Munch et al. |
| 2002/0018889 A1 | 2/2002 | Franck et al. |
| 2002/0061374 A1 | 5/2002 | O'Brien et al. |
| 2002/0193460 A1 | 12/2002 | Kovar et al. |
| 2002/0195910 A1 | 12/2002 | Hus et al. |
| 2003/0003282 A1 | 1/2003 | Roys et al. |
| 2003/0026932 A1 | 2/2003 | Johnson et al. |
| 2003/0060574 A1 | 3/2003 | Muller et al. |
| 2003/0203190 A1 | 10/2003 | Schmidt et al. |
| 2003/0211334 A1 | 11/2003 | Jones |
| 2004/0048073 A1 | 3/2004 | Bacon |
| 2004/0071980 A1 | 4/2004 | McBain et al. |
| 2004/0096630 A1 | 5/2004 | Sakurai et al. |
| 2004/0145092 A1 | 7/2004 | McCollum et al. |
| 2004/0159969 A1 | 8/2004 | Truog et al. |
| 2004/0161567 A1 | 8/2004 | Truog et al. |
| 2004/0170793 A1* | 9/2004 | Linden et al. ............... 428/40.1 |
| 2004/0197572 A1 | 10/2004 | Bell |
| 2004/0200564 A1 | 10/2004 | Kinsey et al. |
| 2004/0208998 A1 | 10/2004 | Steininger et al. |
| 2004/0209057 A1 | 10/2004 | Enlow et al. |
| 2004/0214007 A1 | 10/2004 | Brown et al. |
| 2005/0042431 A1 | 2/2005 | Wagenblast |
| 2005/0059309 A1 | 3/2005 | Tsotsis |
| 2005/0069686 A1* | 3/2005 | Hoops ............... 428/201 |
| 2005/0069698 A1* | 3/2005 | Eubanks et al. ............... 428/354 |
| 2005/0084696 A1 | 4/2005 | Gaggar et al. |
| 2005/0113194 A1 | 5/2005 | Pearson |
| 2005/0136205 A1 | 6/2005 | Stoppelmann et al. |
| 2005/0148404 A1 | 7/2005 | Ignatius |
| 2005/0156358 A1 | 7/2005 | Bellefleur et al. |
| 2005/0159060 A1 | 7/2005 | Shao |
| 2005/0164008 A1 | 7/2005 | Rukavina |
| 2005/0175794 A1 | 8/2005 | Dathe |
| 2005/0181203 A1 | 8/2005 | Rawlings et al. |
| 2005/0186415 A1* | 8/2005 | McCormick ...... B32B 17/10009 428/336 |
| 2005/0191490 A1 | 9/2005 | Ton-That et al. |
| 2005/0214559 A1 | 9/2005 | Minoda et al. |
| 2006/0046028 A1 | 3/2006 | Kaminski et al. |
| 2006/0127666 A1 | 6/2006 | Fuchs |
| 2007/0036929 A1 | 2/2007 | Baird et al. |
| 2007/0047099 A1 | 3/2007 | Clemens et al. |
| 2007/0116933 A1 | 3/2007 | Kobayashi et al. |
| 2007/0178239 A1 | 8/2007 | Kestell et al. |
| 2008/0003406 A1 | 1/2008 | Steelman |
| 2008/0199704 A1 | 8/2008 | Ho et al. |
| 2008/0261014 A1 | 10/2008 | McGuire et al. |
| 2009/0186198 A1 | 7/2009 | McGuire |
| 2010/0059167 A1 | 3/2010 | McGuire |
| 2010/0062250 A1 | 3/2010 | Johnson et al. |
| 2010/0068446 A1 | 3/2010 | McGuire, Jr. et al. |
| 2010/0089434 A1* | 4/2010 | Fishman ............ H01L 31/02021 136/246 |
| 2011/0045306 A1 | 2/2011 | Johnson et al. |
| 2013/0316115 A1 | 11/2013 | Smith et al. |
| 2014/0030462 A1 | 1/2014 | Sullivan |
| 2014/0212674 A1 | 7/2014 | Ho et al. |
| 2015/0099113 A1 | 4/2015 | Ho et al. |
| 2016/0062016 A1 | 3/2016 | Lee et al. |
| 2016/0103250 A1 | 4/2016 | Snyder et al. |

FOREIGN PATENT DOCUMENTS

| | | |
|---|---|---|
| DE | 19715871 | 6/1998 |
| DE | 10214827 | 10/2003 |
| EP | 0 251 546 | 3/1992 |
| EP | 0 978 374 A2 | 2/2000 |
| EP | 1 144 125 | 7/2003 |
| EP | 1386950 | 2/2004 |
| EP | 0 808 885 | 4/2004 |
| EP | 1004608 | 10/2004 |
| EP | 1 481 031 | 7/2007 |
| EP | 2404729 | 1/2012 |
| EP | 2 463 093 | 6/2012 |
| EP | 2 463 094 | 6/2012 |
| JP | 2169228 | 6/1990 |
| JP | 6-143506 | 5/1994 |
| JP | 07-052176 | 2/1995 |
| JP | 07-074322 | 8/1995 |
| JP | 2000-260252 | 9/2000 |
| JP | 2001-253033 | 9/2001 |
| JP | 2003-527258 | 9/2003 |
| JP | 2004-307532 | 11/2004 |
| JP | 2005-125506 | 5/2005 |
| JP | 2005/335120 | 12/2005 |
| WO | WO-90/11878 | 10/1990 |
| WO | WO-92/02731 | 2/1992 |
| WO | WO-92/16367 | 10/1992 |
| WO | WO1992022619 A1 * | 12/1992 |
| WO | WO-93/24551 | 12/1993 |
| WO | WO-94/13465 | 6/1994 |
| WO | WO-96/10595 | 4/1996 |
| WO | WO-97/28472 | 8/1997 |
| WO | WO-98/37115 | 8/1998 |
| WO | WO-01/29144 | 4/2001 |
| WO | WO-02/31074 | 4/2002 |
| WO | WO-2002/028636 | 4/2002 |
| WO | WO-2003/002680 | 1/2003 |
| WO | WO-2003/049942 | 6/2003 |
| WO | WO-03/076542 | 9/2003 |
| WO | WO-2004/067246 | 8/2004 |
| WO | WO 2004/067246 | 8/2004 |
| WO | WO-2005/032812 | 4/2005 |
| WO | WO-2006/118883 | 11/2006 |
| WO | WO-07/48141 | 4/2007 |
| WO | WO-2007/0048141 | 4/2007 |
| WO | WO-2007/120188 | 10/2007 |

(56) References Cited

FOREIGN PATENT DOCUMENTS

| WO | WO-08/51629    | 5/2008 |
|----|----------------|--------|
| WO | WO-2008/0109733| 9/2008 |
| WO | WO-2009/041964 | 4/2009 |
| WO | WO-2016/0018749| 2/2016 |
| WO | WO-2016/0076337| 5/2016 |
| WO | WO-2017/156506 | 9/2017 |

OTHER PUBLICATIONS

"Aircraft Painting," *KLM Engineering & Maintenance*, www.klm-em.com (Jun. 27, 2007).
*Engineering Edge*, Air France KLM (Jan. 2006).
"ECLIPSE High Performance Exterior Topcoat," *Akzo Nobel Aerospace Coatings*, www.akzonobelaerospace.com.
Umamaheswaran, Venkatakrishnan et al., "New Weatherable Film Technology to Eliminate Painting of Automotive Exteriors," *Society of Automotive Engineers: 2001-01-0443*, (2001).
"Epoxy Curing Agents and Modifiers: Amicure CG-1200 Curing Agent," Air Products and Chemicals (Allentown, PA) Publication No. 125-9416.7.
"Epoxy Curing Agents and Modifiers: Amicure UR Curing Agent," Air Products and Chemicals (Allentown, PA) Publication No. 125-9416.11.
"EPON Resin 828 Product Bulletin", Resolution Performance Products (Houston, TX) RP:3075-01 (Apr. 2002).
"Blade Protection Kits Keep Helicopters in the Air," *EngineeringTalk* (www.engineeringtalk.com/news/mmr/mmr102.html) (Sep. 16, 2005).
"EPON Resin Structural Reference Manual—EPON Resins—EPI-CURE Curing Agents—Heloxy Modifiers," Resolution Performance Products (Houston, TX), pp. 3i to 3-6 (2001).
"3M Aircraft Belly Protective Tape 8641 Technical Data Sheet," Minnesota Mining & Manufacturing Co. (St. Paul, MN) Publication No. 70-0703-7681-2 (Mar. 2007).
"3M Polyurethane Protective Tape 8674/8674DL Technical Data Sheet," Minnesota Mining & Manufacturing Co. (St. Paul, MN) Publication No. 60-9700-0074-5 (Nov. 2005).
"3M Polyurethane Protective Tape 8672/8672 GB Technical Data Sheet," Minnesota Mining & Manufacturing Co. (St. Paul, MN) Publication No. 78-9236-7045-5 (Nov. 2004).
"Improved Scotchgard Paint Protection Film Uses Latest 3M Technology," *3M News: SEMA Show 2005*, (Nov. 1, 2005).
"An Amazing New Automotive Finish Protection Film to Keep Your Vehicle in Showroom Condition . . . VentureShield," (http://www.venturetape.com/final/new_products.htm) VentureTape (Rockland, MA).

"Ford Pressure Sensitive Performance Testing (Venture Tape) for Test Materials: 7510 and 7514," ACT Laboratories, Inc. (Hillsdale, MI), published at: http://www.invisiblepatterns.com/pdf/AIN154314C.pdf, (Dec. 30, 2005).
"Paint Protection Film FAQ's," previously published at: http://enprodistributing.com/products/protection/faq.htm, (Jul. 12, 2005)
"Polyurethane Coatings for Automotive Exteriors," published at: http://www.bayermaterialscienceafta.com/industries/automotive/coatings.html#3.
"Scotchgard Paint Protection Film SGPF6 for Professional Applicators," 3M Technical Data Sheet 75-3469-1065-8, Minnesota Mining & Manufacturing Co. (St. Paul, MN) (Apr. 2004).
"Argotec 49510 Technical Data Sheet," Argotech, Inc. (Greenfield, MA) (Oct. 2003).
"EPON Resin 863 Technical Data Sheet," Hexion Specialty Chemicals (Houston, TX) RP:4041 (Jun. 2004).
"EPON Resins and Modifiers," Resolution Performance Products SC:3059-01 (2002).
*AircraftLog: Where Smart Solutions Take Flight*, PPG Industries, Inc. (Huntsville, AL) (May 2005), pp. 10-11 and 16.
"EPON Resin 862 Product Bulletin," Resolution Performance Products (Houston, TX) RP:4048 (Mar. 2005).
"Epoxy Curing Agents and Modifiers: Ancamine 2441 Curing Agent," Air Products and Chemicals (Allentown, PA) Publication No. 125-04-017-GLB (2004).
"CAB-O-SIL TS-720," Cabot Corporation (Billerica, MA) PDS-141 (Jan. 2006).
"Scotchgard Paint Protection Film: Application Guide for Professional Applicators," 3M Technical Update 75-3469-1102-9, Minnesota Mining & Manufacturing Co. (St. Paul, MN) (Apr. 2004).
"3M Paint Protection Film: A Clear Alternative to Vehicle Bras or Guards," 3M Automotive Aftermarket Division 75-3467-9992-9, Minnesota Mining & Manufacturing Co. (St. Paul, MN) (2003).
"3M Paint Protection Film Builds Business through the SEMA Show," *3M Holding Fast*, 3M Automotive Division (St. Paul, MN), 1(25) (2002).
"Venture Shield Paint Protection 7510," VentureTape (Rockland, MA), published at: http://www.venturetape.com/final/automotive_products.asp?id=609 (Jul. 12, 2005).
"Venture Shield—Paint Protection 7512", VentureTape (Rockland, MA), published at: http://www.venturetape.com/final/automotive_products.asp?id=610 (Jul. 12, 2005).
"Test Report—Venture Shield 7510," Bodycote Materials Testing Met-Chem Laboratory, published at: http://www.invisiblepatterns.com/pdf/067682.pdf, Letter Dated Jan. 14, 2003—Report No. 067682 (Jan. 14, 2003).
"Avery Dennison StoneShield Technical Data Sheet".

* cited by examiner

PROTECTIVE SHEETS, ARTICLES, AND METHODS

BACKGROUND OF THE INVENTION

The present invention relates generally to sheets useful for protecting surfaces, methods of making and using the same, and articles comprising applied sheets of the invention.

A variety of protective sheets are known. Many of those are based on one or more polyurethane layers. Polyurethane chemistries generally provide one or more properties including the following: environmental resistance, chemical resistance, abrasion resistance, scratch resistance, optical transparency, and other often desirable properties.

There are many commercially available single-layer polyurethane films from a variety of suppliers such as Stevens Urethane (Easthampton, Mass.) and entrotech, Inc. (Columbus, Ohio). Single-layer polyurethane films have been found useful as carrier layers in multi-layer sheet applications. Such films, however, have found limited use by themselves for protection of certain types of surfaces. For example, protection of painted surfaces often requires retention of the glossy appearance otherwise provided by a recently painted surface. One of the problems associated with single-layer polyurethane films is their often inadequate ability to retain the glossy appearance desired.

Attempts have been made to combine polyurethane films with other materials in the form of a multi-layer protective sheet in order to improve properties of the films, such as gloss retention. In some cases, an exterior (or topcoat) layer is applied to a polyurethane carrier layer in order to impart improved gloss retention.

Several protective sheets are readily available on the market today. For example, Minnesota Mining & Manufacturing Co. ("3M") in St. Paul, Minn., markets polyurethane-based sheet "Paint Protection Film" under the SCOTCHGARD product line. As another example, Venture Tape Corp. in Rockland, Mass., markets such sheets (e.g., designated by product numbers 7510, 7512, and 7514) using the VENTURESHIELD trade designation. Avery Dennison in Strongsville, Ohio markets polyurethane products using the STONESHIELD trade designation. Known sheets for paint protection claim to have a certain degree of non-yellowing properties, gloss retention, and/or abrasion and chemical resistance. Yet, the degree of these properties and/or the ability of the sheets to exhibit such properties long-term are still in need of improvement.

U.S. Pat. No. 5,034,275 refers to a paint-coated sheet material. The material purportedly comprises a flexible and stretchable thermoplastic polyester carrier film, a stretchable aqueous polyurethane paint layer, a stretchable transparent crosslinked polyurethane topcoat layer and, disposed between the carrier film and the paint layer, a thin tie layer formed by coating on the carrier film an aqueous dispersion of a neutralized copolymer of ethylene and an ethylenically unsaturated carboxylic acid. The thickness of the crosslinked polyurethane topcoat layer is stated to be substantially thicker than the paint layer, which is stated to have a thickness of 0.012 to 0.08 millimeter. In that regard, the topcoat layer has a thickness in the range of about 0.02 to 0.25 millimeter, preferably from about 0.03 to 0.1 millimeter.

U.S. Pat. No. 5,114,789 describes a decorative sheet material having a transparent topcoat that can be bonded to various substrates, such as exterior automotive panels, as a protective and decorative coating. The sheet material comprises a thin carrier film, a paint layer adhered to one surface of the carrier film, and a crosslinked topcoat layer. That topcoat layer is stated to be "extremely thick" and at least 0.1 millimeter in embodiments described.

U.S. Pat. No. 5,242,751 describes a paint composite article including a thermally deformable carrier film having, on its first major surface, an adhesive layer and, on its second major surface, a paint layer consisting of a pigmented basecoat covered by a polyurethane topcoat layer.

U.S. Pat. No. 5,268,215 describes a paint-coated film purportedly having good mar resistance. A polyurethane paint layer is coated on a polymeric carrier film. Coated on the upper surface of the paint layer is a polyurethane clearcoat layer, which is then coated with a polyurethane-siloxane topcoat layer. The film can purportedly be thermoformed, stretched, and bonded adhesively to auto body parts, boats, household appliances, and other substrates as protective and decorative coverings having a basecoat-clearcoat appearance.

U.S. Pat. No. 5,468,532 describes a multi-layer graphic article with a color layer. It is based on a polymeric film that is covered with a protective surface layer to purportedly make the article weatherable and resistant to chemical exposure. The protective surface layer is described as being a polyurethane-based material in an exemplary embodiment.

U.S. Pat. No. 6,132,864 describes a painted plastic film, which is coated with two or more coats. It consists of a base plastic film, which is first coated with a filler composition, followed by a pigmented paint coating, and then coating with a transparent plastic film. The base plastic film can be a polyolefin, a polyamide, a polyurethane, a polyester, a polyacrylate, a polycarbonate or mixture of different polymeric substances. The filler composition is described as a composition containing a binder and crosslinking agent among other components. The pigmented paint coating is described as a topcoat comprising a polymeric binder, without or without a crosslinking agent, and a pigment or mixture of pigments. The transparent plastic film is described as being one of the same materials suitable for use as the base film. The multi-layer sheets described therein purportedly have good resistance to stone chipping and corrosion.

U.S. Pat. No. 6,383,644 describes a multi-layer sheet comprising an exterior protective crosslinked polyurethane layer. Internal to the sheet is a polymeric film. On the first major side of the polymeric film, which could also be polyurethane, is the exterior crosslinked polyurethane layer. On the opposite side of the polymeric film is an adhesive layer for adherence of the sheet to a surface after removal of a release liner thereon. The crosslinked polyurethane layer is polycarbonate-based and comprises the reaction product of a polycarbonate polyol or a polycarbonate polyamine and an aliphatic polyisocyanate.

While some protective sheets are known to have one or more desirable properties, it is highly desirable to provide sheets having a combination of properties including: non-yellowing, gloss retention, and extensibility.

BRIEF SUMMARY OF THE INVENTION

Multi-layer protective sheets of the invention are extensible. They are useful in a range of indoor and outdoor applications in, for example, the transportation, architectural and sporting goods industries. The protective sheets can advantageously be applied to at least a portion of a surface of any article where protection is desired. The surface to be protected can be painted or unpainted.

Particularly desirable is a sheet having a combination of not only gloss retention and extensibility, but also resistance to yellowing. For example, if a sheet yellows after prolonged exposure to ultraviolet radiation, the sheet can become visible on the substrate to which it is applied. If the sheet develops even a slight yellow tint, it may not be desirable to apply it to a substrate with a light paint color, such as white. In exemplary embodiments, protective sheets of the invention have a previously unobtainable combination of desired properties including: non-yellowing, gloss retention, and extensibility. Due to the non-yellowing properties of such protective sheets, distortion of the underlying surface's color and undesired visibility of the protective sheet are minimized.

Methods of the invention include those for applying protective sheets of the invention to articles. Such articles include, for example, motorized vehicles and bicycles amongst a multitude of other applications. Particularly when applying protective sheets to non-planar surfaces, extensibility is important. If a sheet is not very extensible, microcracking can occur when the film is stretched too far. Relief cuts may be needed in that case in order to apply such sheets to substrates, particularly those having a complex surface of convex and concave features. Advantageously, extensible protective sheets of the invention address those undesirable features of conventional protective sheets.

According to an exemplary embodiment of the invention, an extensible multi-layer protective sheet comprises a carrier layer; a polyurethane-based topcoat layer; and an adhesive layer. According to another embodiment, an extensible multi-layer protective sheet of the invention comprises a carrier layer; and an essentially uncrosslinked topcoat layer. According to a further embodiment of the latter, the topcoat layer can be polyurethane-based.

Polyurethane-based topcoat layers can include any suitable polyurethanes, such as polycarbonate-based polyurethanes. The topcoat layer can also comprise a silicone polymer according to further embodiments.

The carrier layer can comprise multiple individual film layers or a single film layer. The carrier layer can be, for example, polyurethane-based. In preferred embodiments, the carrier layer is essentially uncrosslinked.

In certain embodiments, protective sheets of the invention can also comprise an adhesive layer, such as for example a pressure-sensitive adhesive. Prior to use, the adhesive layer can be protected by a conventional release liner. In addition, prior to use, a carrier film can be positioned on an exterior surface of the topcoat layer.

Protective sheets of the invention, by virtue of their being extensible, exhibit superior performance and handling properties. In one embodiment, a protective sheet of the invention is capable of elongating more than 200% before breaking.

In another embodiment, a protective sheet of the invention exhibits essentially no plastic deformation when stretched up to about 125% of its initial length. In a further embodiment, a protective sheet of the invention exhibits essentially no plastic deformation when stretched up to about 150% of its initial length. Preferably, a force of less than about 40 Newtons is required to elongate the sheet to 150% its initial length.

In still another embodiment, a protective sheet of the invention exhibits greater than about 210% elongation at break when tested according to ASTM D638-95. In a further embodiment, a protective sheet of the invention exhibits greater than about 260% elongation at break when tested according to ASTM D638-95. In a still further embodiment, a protective sheet of the invention exhibits greater than about 300% elongation at break when tested according to ASTM D638-95. In yet another embodiment, a protective sheet of the invention exhibits greater than about 350% elongation at break when tested according to ASTM D638-95.

A method for forming a protective sheet of the invention comprises steps of: forming a carrier layer; forming an adhesive layer on a first side of the carrier layer; forming a topcoat layer on a carrier film; thermally bonding the topcoat layer to a second side of the carrier layer opposite from the adhesive layer to form an assembly; and optionally, removing the carrier film from the topcoat layer. Another embodiment of a method for forming a protective sheet of the invention comprises steps of: forming a carrier layer; forming an adhesive layer on a first side of the carrier layer; and forming a topcoat layer on a second side of the carrier layer opposite from the adhesive layer. In further embodiments, the method can comprise steps of: contacting the topcoat layer with a smooth plastic film; and heating the topcoat layer and plastic film to form a smooth surface on the topcoat layer.

DETAILED DESCRIPTION OF THE INVENTION

The present invention is directed toward improved multi-layer protective sheets. The protective sheets are advantageously, not only capable of protecting a surface, but also extensible to enable protection and ease of application to non-planar surfaces.

The terms "extensible" and "extensibility" refer to a material's ductility and its ability to be stretched and recover to essentially its original state after stretching. Extensible sheets are capable of recovering to their original state when stretched (i.e., elongated) up to about 125% of their initial length or more. Preferably, extensible sheets are capable of recovering to their original state when stretched up to about 150% of their initial length or more. According to one aspect of the invention, extensible sheets are capable of elongating more than 200% before breaking. Further preferable are extensible sheets that exhibit essentially no plastic deformation when stretched up to about 150% of their initial length.

According to one aspect of the invention, extensible sheets of the invention exhibit greater than about 210% elongation at break when tested according to the Tensile Testing Method described below. In a further embodiment, extensible sheets of the invention exhibit greater than about 260% elongation at break when tested according to the Tensile Testing Method described below. In a still further embodiment, extensible sheets of the invention exhibit greater than about 300% elongation at break when tested according to the Tensile Testing Method described below. In a further embodiment still, extensible sheets of the invention exhibit greater than about 350% elongation at break when tested according to the Tensile Testing Method described below.

According to another aspect of the invention, extensible sheets of the invention exhibit less than about 3% deformation after 25% elongation when tested according to the Recovery Testing Method described below. In a further embodiment, extensible sheets of the invention exhibit less than about 2% deformation after 25% elongation when tested according to the Recovery Testing Method described below. In a still further embodiment, extensible sheets of the invention exhibit less than about 1% deformation after 25% elongation when tested according to the Recovery Testing Method described below.

According to another aspect of the invention, extensible sheets of the invention exhibit less than about 8% deformation after 50% elongation when tested according to the Recovery Testing Method described below. In a further embodiment, extensible sheets of the invention exhibit less than about 5% deformation after 50% elongation when tested according to the Recovery Testing Method described below. In a still further embodiment, extensible sheets of the invention exhibit less than about 2% deformation after 50% elongation when tested according to the Recovery Testing Method described below.

According to another aspect of the invention, extensible sheets of the invention require a force of less than about 40 Newtons to elongate the sheet to 150% its initial length. In a further embodiment, extensible sheets of the invention require a force of less than about 30 Newtons to elongate the sheet to 150% its initial length. In yet a further embodiment, extensible sheets of the invention require a force of less than about 20 Newtons to elongate the sheet to 150% its initial length.

Protective sheets of the invention comprise at least a carrier layer and a topcoat layer. In further embodiments, protective sheets of the invention comprise the following layers in order: a topcoat layer, a carrier layer, and an adhesive layer. The use of multiple sheets according to the invention imparts flexibility in design of protective sheets of the invention. While there may be protective sheets that do not involve each of a topcoat layer, carrier layer, and adhesive layer, each of those individual layers is generally present according to preferred embodiments of the invention in order to maximize performance properties thereof.

Topcoat Layer

In general, the non-adhesive layer adjacent the carrier layer in protective sheets of the invention is referred to as the "topcoat layer." Any suitable type of material can be used for the topcoat layer in order to provide extensible protective sheets of the invention. For example, the topcoat layer can comprise as its base polymer a polycarbonate, a polyvinyl fluoride, a poly(meth)acrylate (e.g., a polyacrylate or a polymethacrylate), a polyurethane, modified (e.g., hybrid) polymers thereof, or combinations thereof.

Preferably, to maximize gloss retention, soil resistance, and other desirable performance properties, the topcoat layer is of relatively high molecular weight. That is, while the topcoat layer can be formed by extrusion according to some embodiments of the invention, the topcoat layer is preferably of a sufficient molecular weight that extrusion thereof is not practical (i.e., if a polyurethane, the polyurethane is not considered extrusion-grade polyurethane by those of ordinary skill in the art).

The topcoat layer of the invention provides improvements for many applications, such as for example, when sheets of the invention are used as protective sheets for non-planar surfaces. Sheets of the invention were found to be significantly more extensible than certain commercially available protective sheets having a crosslinked topcoat layer. Accordingly, in a further embodiment, unlike many conventional protective sheets, protective sheets of the invention comprise an essentially uncrosslinked topcoat layer. In many applications where protective sheets are used, the potential benefits imparted by crosslinking an exterior layer were substantially outweighed by the significantly improved extensibility provided by sheets of the invention.

Any suitable additives can be present in conjunction with the base polymer in the topcoat layer. Other additives are selected as known to those skilled in the art based on the intended application. For example, silicone polymers and/or fluoropolymers can be added to the topcoat layer for improved mar resistance in certain applications. Those skilled in the art are readily able to determine the amount of such additives to use for the desired effect. In an exemplary embodiment, mar resistance is improved with addition of up to about 1% by weight of a silicone polymer or fluoropolymer to the topcoat layer.

While the use of certain amounts of crosslinker may still allow formation of extensible sheets of the invention, if crosslinkers are present, they are generally used in an amount of less than about 4 parts by weight, and preferably less than about 2 parts by weight, based on 100 parts by weight of any polymer crosslinkable therewith prior to any crosslinking reaction. Further, crosslinkers may be present if they are not used in combination with polymers that are crosslinkable therewith or where, if crosslinkable, resulting crosslink density is minimal (e.g., due to minimal reactive sites on the base polymer) so as not to significantly affect extensibility of the sheet. In a preferred embodiment, the topcoat layer is essentially free of crosslinkers and reaction products thereof. As such, crosslinkers and reaction products are not discernible when using chemical analysis.

In one embodiment, the topcoat layer has a thickness of about 1 micron to about 125 microns, or more specifically about 3 microns to about 95 microns. In an exemplary embodiment, the topcoat layer has a thickness of about 20 microns or less, more specifically about 5 microns to about 15 microns.

According to one aspect of the invention, a topcoat layer of the desired thickness is formed using dispersion chemistry. Dispersion chemistry is well known to those skilled in the art. While the % solids will vary, in one embodiment, a dispersion having about 10-15% solids was found useful for formation of the topcoat layer.

To protect the topcoat layer of the sheet, a polymer liner (e.g., a clear polyester liner) or the like may be used and removed before or after the sheet is applied to a substrate.

Carrier Layer

The term "carrier layer" is used herein to refer to the layer(s) of film adjacent to the topcoat layer and between the topcoat layer and the adhesive layer when the adhesive layer is present. In general, the carrier layer of protective sheets of the invention is referred to as a "mid-ply layer" when it contains multiple layers (i.e., "n" number of individual layers). However, the carrier layer of protective sheets of the invention can be a single film layer according to other embodiments of the invention.

Any suitable chemistry can be used for the carrier layer. Suitable base polymers include, for example, polyvinyl chloride, polyvinyl acetate, polypropylene, polyester, poly (meth)acrylate, polyethylene, and polyurethane, and rubbery resins (e.g., silicone elastomers). According to one embodiment, the carrier layer comprises a relatively clear, UV-stable resin such as, for example, a silicone.

When multiple layers form the carrier layer, each of the "n" individual layers can be the same or different chemistries. In an exemplary embodiment, each of the "n" individual layers has essentially the same chemistry.

Any suitable additives can be present in the carrier layer. Other additives are selected as known to those skilled in the art based on the intended application. Those skilled in the art are readily able to determine the amount of such additives to use for the desired effect.

While the use of certain amounts of crosslinker may still allow formation of extensible sheets of the invention, if crosslinkers are present, they are generally used in an amount of less than about 4 parts by weight, and preferably less than about 2 parts by weight, based on 100 parts by weight of any polymer crosslinkable therewith prior to any crosslinking reaction. Further, crosslinkers may be present if they are not used in combination with polymers that are crosslinkable therewith or where, if crosslinkable, resulting crosslink density is minimal (e.g., due to minimal reactive sites on the base polymer) so as not to significantly affect extensibility of the sheet. In a preferred embodiment, the carrier layer is essentially free of crosslinkers and reaction products thereof. As such, crosslinkers and reaction products are not discernible when using chemical analysis.

To further impart desired performance properties, elastic modulus of the carrier layer is similar to the elastic modulus of the topcoat layer in an exemplary embodiment of the invention. One way in which this beneficial property is obtained is through the use of both a topcoat layer and a carrier layer that are essentially uncrosslinked.

According to one embodiment of the invention, the carrier layer has a thickness of about 5 microns to about 1,250 microns. Each of the "n" number of individual film layers therein can be as thin as about 5 microns and up to about 50 microns in thickness, the presence of thicker layers being particularly useful for ballistic applications. However, to impart greater extensibility, a carrier layer having a thickness of about 220 microns or less is used according to one aspect of the invention. According to further aspects, the carrier layer has a thickness of about 180 microns or less. For example, the carrier layer can have a thickness of about 120 microns to about 180 microns. Not only is extensibility of the carrier layer, and hence overall protective sheet, enhanced by using a thinner carrier layer, overall cost of the sheet is reduced in this manner.

Adhesive Layer

When included within protective sheets according to further embodiments of the invention, the adhesive layer is present adjacent the carrier layer and opposite from the topcoat layer. Any suitable adhesive can be used for the adhesive layer according to the invention. In a preferred embodiment, the adhesive layer comprises a pressure-sensitive adhesive.

While any suitable chemistry can be used for the base polymer in the adhesive layer, (meth)acrylate—acrylate and methacrylate—chemistry is preferred. However, other suitable chemistries are known to those skilled in the art and include, for example, those based on synthetic and natural rubbers, polybutadiene and copolymers thereof, polyisoprene or copolymers thereof, and silicones (e.g., polydimethylsiloxane and polymethylphenylsiloxane). Any suitable additives can be present in conjunction with the base polymer in the adhesive layer.

In particular, an adhesive based on 2-ethyl hexyl acrylate, vinyl acetate, and acrylic acid monomers polymerized as known to those skilled in the art was found useful in one embodiment of the invention. The adhesive can be crosslinked, for example, using conventional aluminum or melamine crosslinkers.

In one embodiment, the adhesive layer has a thickness of about 5 microns to about 150 microns. In a further embodiment, the adhesive layer has a thickness of about 30 microns to about 100 microns. However, the thickness of the adhesive layer can vary substantially without departing from the spirit and scope of the invention.

Until its application on a surface, the adhesive layer can be protected using, for example, a conventional release liner. As such, the sheet can be stored and shipped easily in roll or other forms until its application.

In an exemplary embodiment, protective sheets of the invention are polyurethane-based in that they comprise at least one polyurethane-based layer. According to one aspect of this embodiment, polyurethane-based sheets of the invention comprise a polyurethane-based topcoat layer, a carrier layer, and optionally an adhesive layer. See U.S. Pat. No. 4,476,293 for a description of exemplary polycarbonate-based polyurethanes useful for the topcoat layer of the invention.

According to another aspect of this embodiment, the carrier layer is a polyurethane-based layer. For cost-efficiency, the polyurethane used for the carrier layer can be any extrusion grade polyurethane, such as those available from Stevens Urethane of Easthampton, Mass. For example, extrudable aliphatic polyurethanes designated SS-1219-92 and SS-2219-92 are available from Stevens Urethane for this purpose. However, the carrier layer need not be an extruded film, but can be prepared in any suitable manner. In one embodiment, the carrier layer comprises a blown film.

When protective sheets of the invention are polyurethane-based, each polyurethane-based layer comprises a polyurethane film. For simplicity, the term "polyurethane" as used herein includes polymers containing urethane (also known as carbamate) linkages, urea linkages, or combinations thereof (i.e., in the case of poly(urethane-urea)s). Thus, polyurethanes of the invention contain at least urethane linkages and, optionally, urea linkages. In one embodiment, polyurethane-based layers of the invention are based on polyurethanes where the backbone has at least about 80% urethane and/or urea repeat linkages formed during their polymerization.

Polyurethane chemistry is well known to those of ordinary skill in the art. Polyurethane-based layers of the invention can contain polyurethane polymers of the same or different chemistries, the latter commonly understood to be a polymer blend. Polyurethanes generally comprise the reaction product of at least one isocyanate-reactive component, at least one isocyanate-functional component, and one or more other optional components such as emulsifiers and chain extending agents.

Components of polyurethanes are further described below, with reference to certain terms understood by those in the chemical arts as referring to certain hydrocarbon groups. Reference is also made throughout to polymeric versions thereof. In that case, the prefix "poly" is inserted in front of the name of the corresponding hydrocarbon group. Except where otherwise noted, such hydrocarbon groups, as used herein, may include one or more heteroatoms (e.g., oxygen, nitrogen, sulfur, or halogen atoms), as well as functional groups (e.g., oxime, ester, carbonate, amide, ether, urethane, urea, carbonyl groups, or mixtures thereof).

The term "aliphatic group" means a saturated or unsaturated, linear, branched, or cyclic hydrocarbon group. This term is used to encompass alkylene (e.g., oxyalkylene), aralkylene, and cycloalkylene groups, for example.

The term "alkylene group" means a saturated, linear or branched, divalent hydrocarbon group. Particularly preferred alkylene groups are oxyalkylene groups. The term "oxyalkylene group" means a saturated, linear or branched, divalent hydrocarbon group with a terminal oxygen atom. The term "aralkylene group" means a saturated, linear or branched, divalent hydrocarbon group containing at least one aromatic group. The term "cycloalkylene group" means a saturated, linear or branched, divalent hydrocarbon group containing at least one cyclic group. The term "oxycycloalkylene group" means a saturated, linear or branched, divalent hydrocarbon group containing at least one cyclic group and a terminal oxygen atom. The term "aromatic group" means a mononuclear aromatic hydrocarbon group or polynuclear aromatic hydrocarbon group. The term includes arylene groups. The term "arylene group" means a divalent aromatic group.

Many commercially available polyurethanes are available and suitable for use as polyurethane films according to the present invention. For example, polyurethanes are available from Thermedics (Noveon, Inc.) of Wilmington, Mass., under the TECOFLEX trade designation (e.g., CLA-93AV) and from Bayer MaterialScience LLC of Pittsburgh, Pa., under the TEXIN trade designation (e.g., an aliphatic ester-based polyurethane suitable as a base polymer for carrier layers of the invention is available under the trade designation, TEXIN DP7-3008).

Further, any suitable method can be used for preparation of polyurethane films for use in polyurethane-based sheets of the invention. In one embodiment, the polyurethane is prepared and formed into a film using an extruder. This method is preferred for preparation of carrier layers of polyurethane-based sheets of the invention.

In another embodiment, a polyurethane film can be prepared and formed into a film using solution or dispersion chemistry and film coating techniques known to those skilled in the art. Such a film can be prepared by reacting components, including at least one isocyanate-reactive component, at least one isocyanate-functional component, and, optionally, at least one reactive emulsifying compound, to form an isocyanate-terminated polyurethane prepolymer. The polyurethane prepolymer can then be dispersed, and optionally chain-extended, in a dispersing medium to form a polyurethane-based dispersion that can be cast to form a polyurethane film. This method is preferred for preparation of topcoat layers in polyurethane-based sheets of the invention.

When the polyurethane film is prepared from an organic solventborne or waterborne system, once the solution or dispersion is formed, it is easily applied to a substrate and then dried to form a polyurethane film. As known to those of ordinary skill in the art, drying can be carried out either at room temperature (i.e., about 20° C.) or at elevated temperatures (e.g., about 25° C. to about 150° C.). For example, drying can optionally include using forced air or a vacuum. This includes the drying of static-coated substrates in ovens, such as forced air and vacuum ovens, or drying of coated substrates that are continuously conveyed through chambers heated by forced air, high-intensity lamps, and the like. Drying may also be performed at reduced (i.e., less than ambient) pressure.

Any suitable isocyanate-reactive component can be used in this embodiment of the present invention. The isocyanate-reactive component contains at least one isocyanate-reactive material or mixtures thereof. As understood by one of ordinary skill in the art, an isocyanate-reactive material includes at least one active hydrogen. Those of ordinary skill in the polyurethane chemistry art will understand that a wide variety of materials are suitable for this component. For example, amines, thiols, and polyols are isocyanate-reactive materials.

However, it is preferred that the isocyanate-reactive material be a hydroxy-functional material. Polyols are the preferred hydroxy-functional material used in the present invention. Polyols provide urethane linkages when reacted with an isocyanate-functional component, such as a polyisocyanate.

Polyols, as opposed to monols, have at least two hydroxy-functional groups. Diols contribute to formation of relatively high molecular weight polymers without requiring cross-linking, such as is conventionally introduced by polyols having greater than two hydroxy-functional groups. Examples of polyols useful in the present invention include, but are not limited to, polyester polyols (e.g., lactone polyols) and the alkylene oxide (e.g., ethylene oxide; 1,2-epoxypropane; 1,2-epoxybutane; 2,3-epoxybutane; isobutylene oxide; and epichlorohydrin) adducts thereof, polyether polyols (e.g., polyoxyalkylene polyols, such as polypropylene oxide polyols, polyethylene oxide polyols, polypropylene oxide polyethylene oxide copolymer polyols, and polyoxytetramethylene polyols; polyoxycycloalkylene polyols; polythioethers; and alkylene oxide adducts thereof), polyalkylene polyols, polycarbonate polyols, mixtures thereof, and copolymers therefrom.

Polycarbonate-based polyurethanes are preferred according to one embodiment. It was found that this type of polyurethane chemistry easily facilitated obtainment of polyurethane-based sheets with properties desired. See U.S. Pat. No. 4,476,293 for a description of exemplary polycarbonate-based polyurethanes.

In one preferred embodiment, a polycarbonate diol is used to prepare polycarbonate-based polyurethane according to the invention. Although polyols containing more than two hydroxy-functional groups are generally less preferred than diols, certain higher functional polyols may also be used in the present invention. These higher functional polyols may be used alone, or in combination with other isocyanate-reactive materials, for the isocyanate-reactive component.

For broader formulation latitude, at least two isocyanate-reactive materials, such as polyols, may be used for the isocyanate-reactive component. However, as any suitable isocyanate-reactive component can be used to form the polyurethane, much latitude is provided in the overall polyurethane chemistry.

The isocyanate-reactive component is reacted with an isocyanate-functional component during formation of the polyurethane. The isocyanate-functional component may contain one isocyanate-functional material or mixtures thereof. Polyisocyanates, including derivatives thereof (e.g., ureas, biurets, allophanates, dimers and trimers of polyisocyanates, and mixtures thereof), (hereinafter collectively referred to as "polyisocyanates") are the preferred isocyanate-functional materials for the isocyanate-functional component. Polyisocyanates have at least two isocyanate-functional groups and provide urethane linkages when reacted with the preferred hydroxy-functional isocyanate-reactive components. In one embodiment, polyisocyanates useful for preparing polyurethanes are one or a combination of any of the aliphatic or aromatic polyisocyanates commonly used to prepare polyurethanes.

Generally, diisocyanates are the preferred polyisocyanates. Useful diisocyanates include, but are not limited to, aromatic diisocyanates, aromatic-aliphatic diisocyanates, aliphatic diisocyanates, cycloaliphatic diisocyanates, and other compounds terminated by two isocyanate-functional groups (e.g., the diurethane of toluene-2,4-diisocyanate-terminated polypropylene oxide polyol).

Examples of preferred diisocyanates include the following: 2,6-toluene diisocyanate; 2,5-toluene diisocyanate; 2,4-toluene diisocyanate; phenylene diisocyanate; 5-chloro-2,4-toluene diisocyanate; 1-chloromethyl-2,4-diisocyanato benzene; xylylene diisocyanate; tetramethyl-xylylene diisocyanate; 1,4-diisocyanatobutane; 1,6-diisocyanatohexane; 1,12-diisocyanatododecane; 2-methyl-1,5-diisocyanatopentane; methylenedicyclohexylene-4,4'-diisocyanate; 3-isocyanatomethyl-3,5,5'-trimethylcyclohexyl isocyanate (isophorone diisocyanate); 2,2,4-trimethylhexyl diisocyanate; cyclohexylene-1,4-diisocyanate; hexamethylene-1,6-diisocyanate; tetramethylene-1,4-diisocyanate; cyclohexane-1,4-diisocyanate; naphthalene-1,5-diisocyanate; diphenylmethane-4,4'-diisocyanate; hexahydro xylylene diisocyanate; 1,4-benzene diisocyanate; 3,3'-dimethoxy-4,4'-diphenyl diisocyanate; phenylene diisocyanate; isophorone diisocyanate; polymethylene polyphenyl isocyanate; 4,4'-biphenylene diisocyanate; 4-isocyanatocyclohexyl-4'-isocyanatophenyl methane; and p-isocyanatomethyl phenyl isocyanate.

When preparing polyurethane dispersions for casting into layers of polyurethane, the isocyanate-reactive and isocyanate-functional components may optionally be reacted with at least one reactive emulsifying compound according to one embodiment of the invention. The reactive emulsifying compound contains at least one anionic-functional group, cationic-functional group, group that is capable of forming an anionic-functional group or cationic-functional group, or mixtures thereof. This compound acts as an internal emulsifier because it contains at least one ionizable group. Thus, these compounds are referred to as "reactive emulsifying compounds."

Reactive emulsifying compounds are capable of reacting with at least one of the isocyanate-reactive and isocyanate-functional components to become incorporated into the polyurethane. Thus, the reactive emulsifying compound contains at least one, preferably at least two, isocyanate- or active hydrogen-reactive- (e.g., hydroxy-reactive) groups. Isocyanate- and hydroxy-reactive groups include, for example, isocyanate, hydroxyl, mercapto, and amine groups.

Preferably, the reactive emulsifying compound contains at least one anionic-functional group or group that is capable of forming such a group (i.e., an anion-forming group) when reacted with the isocyanate-reactive (e.g., polyol) and isocyanate-functional (e.g., polyisocyanate) components. The anionic-functional or anion-forming groups of the reactive emulsifying compound can be any suitable groups that contribute to ionization of the reactive emulsifying compound. For example, suitable groups include carboxylate, sulfate, sulfonate, phosphate, and similar groups. As an example, dimethylolpropionic acid (DMPA) is a useful reactive emulsifying compound. Furthermore, 2,2-dimethylolbutyric acid, dihydroxymaleic acid, and sulfopolyester diol are other useful reactive emulsifying compounds. Those of ordinary skill in the art will recognize that a wide variety of reactive emulsifying compounds are useful in preparing polyurethanes for the present invention.

One or more chain extenders can also be used in preparing polyurethanes of the invention. For example, such chain extenders can be any or a combination of the aliphatic polyols, aliphatic polyamines, or aromatic polyamines conventionally used to prepare polyurethanes.

Illustrative of aliphatic polyols useful as chain extenders include the following: 1,4-butanediol; ethylene glycol; 1,6-hexanediol; glycerine; trimethylolpropane; pentaerythritol; 1,4-cyclohexane dimethanol; and phenyl diethanolamine. Also note that diols such as hydroquinone bis(β-hydroxyethyl)ether; tetrachlorohydroquinone-1,4-bis(β-hydroxyethyl)ether; and tetrachlorohydroquinone-1,4-bis(β-hydroxyethyl)sulfide, even though they contain aromatic rings, are considered to be aliphatic polyols for purposes of the invention. Aliphatic diols of 2-10 carbon atoms are preferred. Especially preferred is 1,4-butanediol.

Illustrative of useful polyamines are one or a combination of the following: p,p'-methylene dianiline and complexes thereof with alkali metal chlorides, bromides, iodides, nitrites and nitrates; 4,4'-methylene bis(2-chloroaniline); dichlorobenzidine; piperazine; 2-methylpiperazine; oxydianiline; hydrazine; ethylenediamine; hexamethylenediamine; xylylenediamine; bis(p-aminocyclohexyl)methane; dimethyl ester of 4,4'-methylenedianthranilic acid; p-phenylenediamine; m-phenylenediamine; 4,4'-methylene bis(2-methoxyaniline); 4,4'-methylene bis(N-methylaniline); 2,4-toluenediamine; 2,6-toluenediamine; benzidine; 3,4'-dimethylbenzidine; 3,3'-dimethoxybenzidine; dianisidine; 1,3-propanediol bis(p-aminobenzoate); isophorone diamine; 1,2-bis(2'-aminophenylthio)ethane; 3,5-diethyl toluene-2,4-diamine; and 3,5-diethyl toluene-2,6-diamine. The amines preferred for use are 4,4'-methylene bis(2-chloroaniline); 1,3-propanediol bis(p-aminobenzoate); and p,p'-methylenedianiline and complexes thereof with alkali metal chlorides, bromides, iodides, nitrites and nitrates.

Protective Sheet Formation

In one embodiment, each of the individual layers of the protective sheet is prepared before assembly into the final multi-layer protective sheet. Any suitable method for preparation of each can be used as known to those skilled in the art.

For preparation of the carrier layer, for example, a film can be extruded onto a separate carrier film (e.g., polyester film) to form a supported carrier layer, after which the supporting carrier film is removed at some point before both sides of the carrier layer are able to be coated. In one embodiment, each of the "n" individual layers is cast successively onto each layer to form the overall carrier layer.

For preparation of the adhesive layer, any suitable method can be used. For example, a film of the desired thickness can be cast onto a release film according to one embodiment and as known to those skilled in the art. In one embodiment, the film of adhesive contained on the release film can be laminated to the unsupported side of the carrier layer, after which time the supporting carrier film is removed from the carrier layer for application of the topcoat layer.

For preparation of the topcoat layer, any suitable method can be used. For example, a topcoat film of the desired thickness can be cast onto a smooth film (e.g., polyester) according to one embodiment and as known to those skilled in the art. In one embodiment, the supported topcoat film is then laminated to the exposed side of the carrier layer, opposite from the adhesive layer. The smooth film used for formation of the topcoat film can remain in the assembly until application of the sheet to a surface in order to provide extra protection during shipping and storage of the sheet.

According to this embodiment, any suitable method can be used to laminate the topcoat layer to the carrier layer. For example, the topcoat layer can be adhered directly to the carrier layer using thermal bonding. According to this method, a preformed topcoat film is adhered to the carrier layer and bonded using heat and, optionally, pressure.

According to one aspect of this embodiment, thermal bonding occurs upon application of heat in an amount sufficient to begin to at least partially melt at least one of the layers to be bonded. Bonding is further enhanced when both layers to be bonded begin to at least partially melt. While the melting temperature of each layer can vary, in those applications requiring high temperature exposure, it is preferred that the melting temperature of each of the carrier layer and the topcoat layer is at least about 120° C. (250° F.).

While it can vary, if used, generally pressure will be applied in an amount of up to about 690 Pa (100 psi), or more typically up to about 345 Pa (50 psi). As an example, the layers can be adhered according to this method when contacted for about three seconds with application of heat 150° C. (300° F.) and 140 Pa (20 psi) pressure.

According to another embodiment, at least one of the adhesive layer and the topcoat layer is formed by direct coating onto the carrier layer according to conventional methods. However, this method resulted in sheets having, for example, a topcoat layer more susceptible to having a surface marked by an orange peel-type texture. Therefore, use of the thermal bonding method is preferred.

If the topcoat layer is direct coated, however, a smooth plastic film (e.g., polyester) can be heat laminated to the exterior surface of the topcoat layer in order to reduce the orange peel appearance of the topcoat layer's surface. According to this embodiment, the topcoat layer is contacted with a smooth plastic film and then heated, optionally with pressure, at a temperature and for a time sufficient to smooth the surface of the topcoat layer as desired.

While the above-described process relies primarily on preparation of individual layers and then adhering those layers together to form the sheet, according to another embodiment of the invention, some or all of the sheet's layers can be formed simultaneously by co-extrusion. As known to those skilled in the art, co-extrusion often facilitates processing efficiency. No matter what method is used, the process can be a continuous or batch process.

Protective Sheet Use

Beneficially, protective sheets of the invention have good gloss retention, non-yellowing properties, and extensibility. Protective sheets of the invention are useful in a range of indoor and outdoor applications in, for example, the transportation, architectural and sporting goods industries. Exemplary applications including those including motorized vehicles and bicycles, among many other articles. Preferably, protective sheets of the invention have smooth, glossy surfaces and a substantially uniform thickness throughout in order to maximize their capability of providing seemingly invisible protection to a surface.

During use, a protective sheet is applied to a surface, preferably in such a way as to conform to the shape of the surface. Particularly when applying protective sheets to non-planar surfaces, extensibility is important. If a sheet is not very extensible, micro-cracking can occur when the film is stretched too far. Relief cuts may be needed in that case in order to apply such sheets to substrates, particularly those having a complex surface of convex and concave features. However, according to preferred embodiments of the invention, relief cuts are not necessary when applying protective sheets of the invention to complex surfaces. Such protective sheets are readily conformable due to their extensibility.

Protective sheets of the invention can be readily and easily applied to a surface based on knowledge of those skilled in the art. When an adhesive layer is included within the protective sheet, the adhesive layer is generally adhered to the surface to be protected after removal of any release liner present thereon to expose the adhesive. When a pressure-sensitive adhesive layer is used, the protective sheet can be more easily repositioned before being firmly adhered to a surface. When an adhesive layer is not included within the protective sheet, the adhesive sheet is otherwise adhered to a surface using any conventional method, including thermal or other bonding mechanisms.

EXAMPLES

Exemplary embodiments and applications of the invention are described in the following non-limiting examples and related testing methods.

Tensile Testing Method

For tensile testing, samples were formed into standard tensile testing specimens according to ASTM D638-95 using designations for Type II measurements. Tensile testing was performed according to ASTM D638-95. The rate at which the jaws holding the specimen were pulled in a tensile manner was 1.0 millimeter/minute (0.04 inch/minute) to measure the elastic modulus of the sample, but increased to 300 millimeters/minute (11.8 inches/minute) to obtain the ultimate tensile strength and elongation data. Test data using this method is reported in Table 1.

Recovery Testing Method

For recovery testing, a generally rectangular sample having an initial length of 25 centimeters (10 inches) and width of 5 centimeters (2 inches) was prepared. The sample was stretched in tension until its length exceeded its initial length by a predetermined percentage (25% or 50%). After recovery equilibrium was obtained (approximately 5-10 minutes), the length of the relaxed sample was measured and the sample was qualitatively analyzed for defects or deformation. The change in length of the sample as compared to the initial length is reported as its "Percent Deformation" in Table 2. Note that values reported in Table 2 have a standard deviation of about plus/minus 0.6%.

Elongation Force Testing Method

Force required to elongate a generally rectangular sample having an initial length of 12.5 centimeters (5 inches) and width of 5 centimeters (2 inches) was measured using an IMASS SP2000 slip/peel tester (available from IMASS, Inc. of Accord, Mass.) operating at a speed of 30 centimeters/minute (12 inches/minute). Two forces were measured for each sample, those being that required to elongate the sample to 125% of its initial length and that required to elongate the sample to 150% of its initial length. The forces so measured are also reported in Table 2.

Weathering Testing Method

Where indicated, samples were tested for weathering resistance using a well-known QUV test method and weatherometer. The weathering conditions were as set forth in ASTM D4329.

Protective Sheet Example 1

A polyurethane-based sheet of the invention was prepared such that the sheet comprised a carrier layer having a thickness of 150 microns, a topcoat layer having a thickness of 18 microns, and an adhesive layer having a thickness of 60 microns. The adhesive layer was adhered to the opposite side of the carrier layer from the topcoat layer. A standard release liner was positioned exterior to the adhesive layer, but was removed prior to testing.

To prepare the sheet, first a 98# polyethylene-coated kraft paper with silicone coated on one side was used as a release liner onto which the adhesive layer was formed. The adhesive layer was formed from an adhesive composition prepared by charging a closed vessel with initial components as follows: 20% by weight 2-ethyl hexyl acrylate, 5% by weight methyl acrylate, 1% by weight acrylic acid, 37% by weight ethyl acetate, 7% by weight isopropyl alcohol, 26.1% by weight toluene, and 3.75% by weight n-propanol. The weight percentages of each component were based on total weight of the reaction components, which also included 0.15% by weight benzoyl peroxide (98%) added in partial increments. To the initial components, 10% by weight of the benzoyl peroxide was first added. Then, the components were charged under a nitrogen atmosphere and using agitation. The vessel was heated at 80° C. until exotherm was reached. The exotherm was maintained by addition of the remaining benzoyl peroxide. After the benzoyl peroxide was depleted and the exotherm was complete, aluminum acetal acetonate was added to the polymerized solution in the amount of 0.4% by weight based on solid weight of the polymer.

This adhesive composition was coated onto the release liner and dried in a 14-zone oven, at 20 seconds per zone, with the zone temperatures set as follows: zone 1 (50° C.), zone 2 (60° C.), zone 3 (70° C.), zone 4 (80° C.), zone 5 (90° C.), zone 6 (90° C.), zones 7-10 (100° C.), and zones 11-14 (120° C.). With drying, the aluminum acetal acetonate functioned to crosslink the polymer. The thickness of the adhesive layer thus formed was 60 microns. The construction was then run through a chill stack to reduce the temperature to about 30° C.

A 150-micron-thick film of extruded aliphatic polyurethane, available from Stevens Urethane under the trade designation, SS-2219-92, was then provided and laminated to the exposed adhesive layer. This further construction was run through the 14-zone oven and then again chilled to about 30° C.

Meanwhile, an 18-micron-thick film for the topcoat layer was formed on a 76-micron thick (3-mil-thick) silicone-coated polyester carrier film. The film was formed by solution coating the polyurethane-based composition described below on the supporting carrier film. After the composition was coated on the carrier film, it was run through the 14-zone oven and then chilled to about 30° C.

The polyurethane-based composition was prepared by charging a closed vessel with 7.36% by weight of a hybrid linear hexane diol/1,6-polycarbonate polyester having terminal hydroxyl groups, 43.46% by weight toluene, 43.46% by weight isopropyl alcohol, and 0.03% by weight dibutyl tin laureate. The weight percentages of each component were based on total weight of the reaction components, which also included 5.68% by weight isophorone diisocyanate added later. The components were charged under a nitrogen atmosphere and using agitation. After the vessel was heated to 90° C., 5.68% by weight isophorone diisocyanate was continually added to the vessel through the resultant exotherm. After the exotherm was complete, the composition was maintained at 90° C. for one additional hour while still using agitation.

Once the topcoat layer was thus formed, it was thermally bonded to the exposed surface of the carrier layer. During thermal bonding, the carrier layer and the topcoat layer were contacted for about three seconds with application of heat 150° C. (300° F.) and 140 Pa (20 psi) pressure. Prior to testing, the release liner and carrier film were removed.

All of the individual components used in preparation of the protective sheet are readily available from a variety of chemical suppliers such as Aldrich (Milwaukee, Wis.) and others. For example, the isopropyl alcohol and toluene can be obtained from Shell Chemicals (Houston, Tex.).

Samples of the sheet were then tested according to the Tensile Testing Method, Recovery Testing Method, and Elongation Force Testing Method described above. Test data is reported in Table 1 in comparison with that from Comparative Sheet Example C1 described below.

Further, samples of the sheet were tested according to the Weathering Testing Method described above. After weathering for 500 hours, no visible yellowing was observed by the unaided human eye.

Finally, samples of the sheet were tested for deglossing by placing them in an outside environment in the states of Florida and Arizona for approximately one year. After one year, no visible deglossing was observed by the unaided human eye.

Comparative Sheet Example C1

A multi-layer protective sheet available from Minnesota Mining & Manufacturing Co. of St. Paul, Minn., under the trade designation, SCOTCHGARD PAINT PROTECTION FILM SGPPF6, was provided. Samples of the sheet were then tested according to the Tensile Testing Method, Recovery Testing Method, and Elongation Force Testing Method described above. Test data is reported in Table 1 in comparison with that from Sheet Example 1 described above.

Further, samples of the sheet were tested according to the Weathering Testing Method described above. After weathering for only 250 hours, visible yellowing was observed by the unaided human eye.

Finally, samples of the sheet were tested for deglossing by placing them in an outside environment in the states of Florida and Arizona for approximately one year. After one year, no visible deglossing was observed by the unaided human eye.

TABLE 1

| Ex. | Test Temperature ° C./° F. | Ultimate Tensile Strength (MPa/psi) | Elastic Modulus (MPa/psi) | Elongation at Break (%) |
| --- | --- | --- | --- | --- |
| 1 | 24/75 | 58.4/8,460 | 61/8,800 | 390 |
| C1 | 24/75 | 28.8/4,170 | 75/11,000 | 200 |

As illustrated in Table 1, advantageously the polyurethane-based sheet of Sheet Example 1 has an ultimate tensile strength of 58.4 MPa as compared to the much lower ultimate tensile strength of the sheet of Comparative Sheet Example C1, which has a value of 28.8 MPa. It is commonly understood that ultimate tensile strength is the limit stress at which a material actually breaks, with a sudden release of the stored elastic energy therein. In basic terms, ultimate tensile strength is a measure of how far a material will stretch before it breaks. The more a material can be stretched, the easier it will be to apply to a surface. For example, such materials are able to more easily conform to complex surfaces, including both concave and convex surfaces, without requiring relief cuts. Because of this ease in application, polyurethane-based sheets of the invention can readily be installed by those having much less experience and skill than is typically required for installation of other types of protective films on the market today. For example, as relief cuts are not required, not only is installation more simple, but it also takes less time.

As also illustrated by Table 1, elongation at break measured for the exemplified polyurethane-based protective sheet of the invention is superior to that measured for the conventional protective sheet of Comparative Sheet Example C1. Elongation at break for Sheet Example 1 was measured to be 390%, which is almost double the comparable value of 200%, which was measured with respect to Comparative Sheet Example C1. It is commonly understood that elongation at break is a measure of the ductility of a material as determinable from tensile testing. It is believed that polyurethane-based sheets of the invention have significantly better elongation at break properties due to the limited crosslinking and other selection of materials therein. Because of this benefit, polyurethane-based protective sheets of the invention are able to more easily conform to complex surfaces, including both concave and convex surfaces, as noted above. They are extensible.

TABLE 2

| Sheet Ex. | Percent Deformation After 25% Elongation | Force Required to Elongate to 125% Initial Length (Newtons/pounds-force) | Percent Deformation After 50% Elongation | Force Required to Elongate to 150% Initial Length (Newtons/pounds-force) |
|---|---|---|---|---|
| 1 | −0.3 | 6.1/1.4 | −0.6 | 18.9/4.3 |
| C1 | 3.1 | 8.3/1.9 | 8.8 | 42.8/9.6 |

The phenomenon that occurs when a sample does not retract to its initial length (i.e., recover) after stretching is generally attributed to plastic deformation. Plastic deformation prevents a sample from recovering and represents a permanent change in the shape of a material as a result of the application of an applied stress. In order to maintain the integrity of a protective sheet and facilitate secure attachment to a surface, it is preferable for the sheet to recover to the extent possible. Sheets that do not fully recover complicate the method of their application and often lead to less than ideal protection of a surface.

As noted in Table 2, samples of Comparative Sheet Example C1 did not fully recover when elongated even the relatively small amount of 25%. Plastic deformation when elongated 50% was even more prevalent. Further, when qualitatively assessed after 50% elongation, the sample of Comparative Sheet Example C1 had curled back up on itself, which rendered it unusable for future applications or testing. In contrast, samples of the invention (Sheet Example 1) did not exhibit the curling behavior and remained essentially flat. It is believed that this is due to the fact that the carrier layer and the topcoat layer of the samples prepared according to Sheet Example 1 have similar modulus properties, which facilitates return of such sheets to their original dimensions at normal levels of stretching.

Comparative Sheet Example C2

A sheet was formed as set forth in Sheet Example 1, except for a topcoat layer was not part of the construction. Samples of the sheet were tested for deglossing by placing them in an outside environment in the states of Florida and Arizona for approximately one year. After one year, visible deglossing was observed by the unaided human eye. Thus, a benefit of utilizing a topcoat layer to minimize deglossing was demonstrated.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

The invention claimed is:

1. A multi-layer protective sheet consisting essentially of:
a polyurethane-based carrier layer;
an essentially uncrosslinked topcoat layer that is not an extrusion-grade polyurethane, wherein crosslinkers and reaction products thereof are not discernible in the topcoat layer when using chemical analysis;
wherein an outermost adhesive later is present on a side of the carrier layer opposite from that of the topcoat layer;
and
optionally, a carrier film on an exterior surface of the topcoat layer, wherein the sheet is extensible, has a substantially uniform thickness throughout, and is essentially invisible on a substrate to which it is applied.

2. The sheet of claim 1, wherein the carrier layer comprises multiple individual film layers.

3. The sheet of claim 1, wherein the carrier layer is essentially uncrosslinked, wherein crosslinkers and reaction products thereof are not discernible in the carrier layer when using chemical analysis.

4. The sheet of claim 1, wherein the topcoat layer is polyurethane-based.

5. The sheet of claim 1, wherein the topcoat layer comprises a polycarbonate-based polyurethane.

6. The sheet of claim 1, wherein the topcoat layer comprises a silicone polymer.

7. The sheet of claim 1, wherein the adhesive layer comprises a pressure-sensitive adhesive.

8. The sheet of claim 1, wherein a release film is present on an exterior surface of the adhesive layer.

9. The sheet of claim 1, wherein the carrier film on an exterior surface of the topcoat layer is present.

10. The sheet of claim 1, wherein the sheet is capable of elongating more than 200% before breaking.

11. The sheet of claim 1, wherein the sheet exhibits essentially no plastic deformation when stretched up to about 125% of its initial length.

12. The sheet of claim 1, wherein the sheet exhibits essentially no plastic deformation when stretched up to about 150% of its initial length.

13. The sheet of claim 1, wherein the sheet exhibits greater than about 300% elongation at break when tested according to ASTM D638-95.

14. The sheet of claim 1, wherein the sheet exhibits greater than about 350% elongation at break when tested according to ASTM D638-95.

15. The sheet of claim 1, wherein a force of less than about 40 Newtons is required to elongate the sheet to 150% its initial length.

16. An article comprising at least one surface having on at least a portion thereof the sheet of claim 1.

17. The article of claim 16, wherein the article comprises a motorized vehicle.

18. The article of claim 16, wherein the article comprises a bicycle.

19. A method of using the sheet of claim 1 to protect a surface on a motorized vehicle, the method comprising:
providing the sheet of claim 1; and
applying the sheet to the surface of the motorized vehicle.

20. The method of claim 19, wherein the surface is at least partially painted.

21. A method of protecting a non-planar surface, comprising:
providing the sheet of claim 1; and
applying the sheet to the non-planar surface.

22. A method for forming the protective sheet of claim 1, the method comprising steps of:
forming the carrier layer;
forming the adhesive layer on a first side of the carrier layer;
forming the topcoat layer on the carrier film;
thermally bonding the topcoat layer to a second side of the carrier layer opposite from the adhesive layer to form an assembly; and
optionally, removing the carrier film from the topcoat layer.

23. A method for forming the protective sheet of claim 1, the method comprising steps of:
forming the carrier layer;
forming the adhesive layer on a first side of the carrier layer; and
forming the topcoat layer on a second side of the carrier layer opposite from the adhesive layer.

24. The method of claim 23, further comprising steps of:
contacting the topcoat layer with a smooth plastic film; and
heating the topcoat layer and plastic film to form a smooth surface on the topcoat layer.

25. The sheet of claim 1, wherein the carrier layer has a thickness of about 120 microns to about 180 microns.

26. The sheet of claim 1, wherein the topcoat layer has a thickness of about 20 microns or less.

27. The sheet of claim 1, wherein the topcoat layer has a thickness of about 5 microns to about 15 microns.

28. The sheet of claim 1, wherein the carrier layer is based on a polyurethane with a backbone having at least about 80% urethane and/or urea repeat linkages formed during its polymerization.

29. A multi-layer protective sheet consisting of:
a polyurethane-based carrier layer;
an essentially uncrosslinked topcoat layer that is not an extrusion-grade polyurethane, wherein crosslinkers and reaction products thereof are not discernible in the topcoat layer when using chemical analysis;
optionally, an adhesive layer;
optionally, a release film on an exterior surface of the adhesive layer; and
optionally, a carrier film on an exterior surface of the topcoat layer,
wherein the protective sheet is extensible, has a substantially uniform thickness throughout, and is essentially invisible on a substrate to which it is applied.

30. The sheet of claim 1, wherein no visible yellowing is observed by an unaided human eye when tested for weathering for 250 hours according to ASTM D4329.

31. The sheet of claim 1, wherein no visible yellowing is observed by an unaided human eye when tested for weathering for 500 hours according to ASTM D4329.

32. The sheet of claim 1, wherein no visible deglossing is observed by an unaided human eye after placement of the sheet in an outside environment in Florida or Arizona for one year.

* * * * *

UNITED STATES PATENT AND TRADEMARK OFFICE
CERTIFICATE OF CORRECTION

PATENT NO. : 10,265,932 B2
APPLICATION NO. : 12/090574
DATED : April 23, 2019
INVENTOR(S) : James E. McGuire, Jr.

It is certified that error appears in the above-identified patent and that said Letters Patent is hereby corrected as shown below:

In the Claims

In Column 18, Line 8, (Line 7 of Claim 1), replace "later" with "layer".

Signed and Sealed this
Twenty-fifth Day of June, 2019

Andrei Iancu
*Director of the United States Patent and Trademark Office*